US011933646B2

(12) United States Patent
Li et al.

(10) Patent No.: US 11,933,646 B2
(45) Date of Patent: Mar. 19, 2024

(54) INTERFEROMETRIC DEMODULATION SYSTEM AND METHOD FOR LARGE CAPACITY FIBER GRATING SENSING NETWORK (71) Applicant: Wuhan University of Technology, Wuhan (CN)

(72) Inventors: Zhengying Li, Wuhan (CN); Jiaqi Wang, Wuhan (CN); Honghai Wang, Wuhan (CN)

(73) Assignee: Wuhan University of Technology, Wuhan (CN)

( * ) Notice: Subject to any disclaimer, the term of this patent is extended or adjusted under 35 U.S.C. 154(b) by 345 days.

(21) Appl. No.: 17/488,304

(22) Filed: Sep. 29, 2021

(65) Prior Publication Data
US 2022/0373366 A1  Nov. 24, 2022

Related U.S. Application Data (63) Continuation of application No. PCT/CN2021/117257, filed on Sep. 8, 2021.

(30) Foreign Application Priority Data

May 14, 2021 (CN) .......................... 202110530402.2

(51) Int. Cl.
*G01D 5/353* (2006.01)
*H04B 10/548* (2013.01)
(52) U.S. Cl.
CPC ..... *G01D 5/35329* (2013.01); *G01D 5/35303* (2013.01); *H04B 10/548* (2013.01)
(58) Field of Classification Search
CPC .......... G01D 5/35329; G01D 5/35303; H04B 10/548
See application file for complete search history.

(56) References Cited

U.S. PATENT DOCUMENTS 5,724,371 A * 3/1998 Magne ............... G01D 5/35387
372/102
5,987,197 A * 11/1999 Kersey ............... G01D 5/35383
385/12

(Continued)

FOREIGN PATENT DOCUMENTS

| CN | 105466478 A | 4/2016 |
| CN | 107655504 A | 2/2018 |
| CN | 110429987 A | 11/2019 |

OTHER PUBLICATIONS

Badar et al., Integrated auxiliary interferometer to correct non-linear tuning errors in OFDR, Proc. SPIE 11405, Optical Waveguide and Laser Sensors, 114050G (May 8, 2020); doi: 10.1117/12.2558910 (Year: 2020).*

(Continued)

*Primary Examiner* — Peter Radkowski
(74) *Attorney, Agent, or Firm* — Nitin Kaushik (57) ABSTRACT

An interferometric demodulation system for a large capacity fiber grating sensing network is provided by the present disclosure, comprising: a continuous light output end of the nanoscale wide-spectrum light source is connected to an input end of the pulse optical modulator, an output end of the reference grating is connected to an input end of the grating array sensing network, and a third communication end of the optical circulator is connected to an input end of the optical amplifier, an output end of the optical amplifier is connected to an input end of the Mach-Zehnder interferometer, three-channel signal output ends of the Mach-Zehnder interferometer are respectively connected to signal input ends corresponding to the embedded signal processor through the photoelectric converter, and the embedded signal processor controls the heating device to control a temperature of an any one of interference arms of the Mach-Zehnder interferometer.

9 Claims, 2 Drawing Sheets

(56) References Cited

U.S. PATENT DOCUMENTS

| | | | | |
|---|---|---|---|---|
| 6,137,565 | A * | 10/2000 | Ecke | G01D 5/35335 374/E11.016 |
| 6,285,806 | B1 * | 9/2001 | Kersey | G01D 5/35383 385/12 |
| 6,571,027 | B2 * | 5/2003 | Cooper | G02B 6/293 19 385/12 |
| 6,640,647 | B1 * | 11/2003 | Hong | G01D 5/35316 250/227.27 |
| 6,785,004 | B2 * | 8/2004 | Kersey | E21B 47/113 356/477 |
| 7,109,471 | B2 * | 9/2006 | Taverner | G01J 3/26 385/13 |
| 7,157,693 | B2 * | 1/2007 | Thingbo | G01D 5/35387 385/12 |
| 7,538,860 | B2 * | 5/2009 | Moore | G02B 6/02076 356/478 |
| 8,189,200 | B2 * | 5/2012 | Menezo | G01B 9/02007 356/478 |
| 8,208,767 | B2 * | 6/2012 | Duncan | E21B 47/06 385/12 |
| 8,909,040 | B1 * | 12/2014 | Parker, Jr. | G02B 6/35 398/87 |
| 9,310,273 | B2 * | 4/2016 | Niewczas | G01D 5/35335 |
| 9,810,556 | B2 * | 11/2017 | Ouellette | G01D 5/35383 |
| 11,193,818 | B2 * | 12/2021 | Jin | G01D 5/35316 |
| 2002/0025097 | A1 * | 2/2002 | Cooper | G01L 1/246 385/12 |
| 2002/0063866 | A1 * | 5/2002 | Kersey | E21B 47/113 356/478 |
| 2005/0269489 | A1 * | 12/2005 | Taverner | G01J 9/02 250/227.14 |
| 2006/0131488 | A1 * | 6/2006 | Thingbo | G01D 5/35316 250/227.23 |
| 2007/0047867 | A1 * | 3/2007 | Goldner | E21B 47/107 385/12 |
| 2009/0046276 | A1 * | 2/2009 | Moore | G02B 6/2932 356/73.1 |
| 2010/0302549 | A1 * | 12/2010 | Menezo | G01B 9/02014 356/478 |
| 2011/0110621 | A1 * | 5/2011 | Duncan | G01D 5/35316 385/13 |
| 2014/0211202 | A1 * | 7/2014 | Niewczas | G01D 5/35335 356/73.1 |
| 2015/0285683 | A1 * | 10/2015 | Ouellette | G01D 5/35383 356/451 |
| 2021/0033452 | A1 * | 2/2021 | Jin | G01D 5/35316 |

OTHER PUBLICATIONS

Chen et al., Thermo-optic-based phase-shifter power dither for silicon IQ optical modulator bias-control technology, Opt. Express 27, 21546-21564 (2019) (Year: 2019).*

Dai et al., Design of Thermo-Optic Variable Optical Attenuator Based on Quartz Substrate, Optics and Photonics Journal, 2013, 3, 158-161 doi:10.4236/opj.2013.32B038 Published Online Jun. 2013 (http://www.scirp.org/journal/opj) (Year: 2013).*

Hai et al., A Thermally Tunable 1 x 4 Channel Wavelength Demultiplexer Designed on a Low-Loss Si3N4 Waveguide Platform. Photonics 2015, 2, 1065-1080. https://doi.org/10.3390/photonics2041065 (Year: 2015).*

Huang et al., Distributed fiber-optic sensor for location based on polarization-stabilized dual-Mach-Zehnder interferometer, Opt. Express 28, 24820-24832 (2020) (Year: 2020).*

Kamenev et al., Use of 3×3 Coupler in the Fiber Optic Strainmeter Based on Mach-Zehnder Interferometer. KnE Energy, 3(3), 388-392. 2018. https://doi.org/10.18502/ken.v3i3.2052 (Year: 2018).*

Li et al., Distributed Acoustic Sensing System Based on Broadband Ultra-Weak Fiber Bragg Grating Array, in 26th International Conference on Optical Fiber Sensors, OSA Technical Digest (Optica Publishing Group, 2018), paper ThE14. (Year: 2018).*

Li et al., Simultaneous distributed static and dynamic sensing based on ultra-short fiber Bragg gratings, Opt. Express 26, 17437-17446 (2018) (Year: 2018).*

Ma et al., Long-Range Distributed Fiber Vibration Sensor Using an Asymmetric Dual Mach-Zehnder Interferometers, J. Lightwave Technol. 34, 2235-2239 (2016) (Year: 2016).*

Shen et al., High-Performance Silicon 2 × 2 Thermo-Optic Switch for the 2-μ\mum Wavelength Band, in IEEE Photonics Journal, vol. 11, No. 4, pp. 1-6, Aug. 2019, Art No. 6602306, doi: 10.1109/JPHOT.2019.2921923. (Year: 219).*

Wang et al., Distributed OTDR-interferometric sensing network with identical ultra-weak fiber Bragg gratings, Opt. Express 23, 29038-29046 (2015) (Year: 2015).*

Ying et al., Demodulation method of Fabry-Perot sensor by cascading a traditional Mach-Zehnder interferometer, Optics & Laser Technology, vol. 118, 2019, pp. 126-131, ISSN 0030-3992, https://doi.org/10.1016/j.optlastec.2019.04.043. (Year: 2019).*

Zhang et al., Temperature sensor with enhanced sensitivity based on silicon Mach-Zehnder interferometer with waveguide group index engineering, Opt. Express 26, 26057-26064 (2018) (Year: 2018).*

Horsten et al., Interrogation of a ring-resonator ultrasound sensor using a fiber Mach-Zehnder interferometer, Opt. Express 25, 31622-31639 (2017) (Year: 2017).*

Zang et al., Analysis of optical switching in a Yb3+-doped fiber Bragg grating by using self-phase modulation and cross-phase modulation, Appl. Opt. 51, 3424-3430 (2012) (Year: 2012).*

* cited by examiner

INTERFEROMETRIC DEMODULATION SYSTEM AND METHOD FOR LARGE CAPACITY FIBER GRATING SENSING NETWORK

CROSS-REFERENCE TO RELATED APPLICATIONS

The application claims priority to Chinese patent application No. 202110530402.2, filed on May 14, 2021, the entire contents of which are incorporated herein by reference.

TECHNICAL FIELD

The present disclosure relates to the technical field of fiber grating sensing, in particular to an interferometric demodulation system and method for a large capacity fiber grating sensing network.

BACKGROUND

Fiber Bragg Grating (FBG) sensing is one of the most promising sensing technologies in the field of sensing, and sensing and monitoring of complex working conditions are realized by using the temperature and strain sensitivity of FBG center wavelength. In terms of performance optimization, the sensing density of the sensing network can be improved by increasing the number of sensors through large-scale networking; the response speed of the sensing network can be improved by optimizing the demodulation method to shorten the demodulation time of the sensor; the measurement accuracy of the sensing network can be improved by improving the system design and reducing the system noise level. However, the current FBG sensing system still can not solve the technical problem of high-speed, high-precision and large-capacity sensing.

In terms of demodulation speed, the FBG demodulation system based on interferometer has the characteristics of fast demodulation speed by converting wavelength change into phase change, avoiding the scanning of laser wavelength and reconstruction of grating spectrum. However, the system can only measure the relative wavelength change of the grating, and can not measure the absolute wavelength, so the application field is limited. In addition, the traditional interferometric FBG demodulation system usually adopts Wavelength Division Multiplexing (WDM) mode for networking, and the number of sensors is limited by the broadband of the light source, which is dozens at most. In order to increase the number of sensors in the sensing network, researchers proposed an interferometric FBG demodulation system based on the Testing Data Management (TDM) networking mode of pulse modulation, with the advantages of large capacity and high demodulation speed.

However, with the use of pulse modulation technology, the hardware broadband of the system is improved and makes the high-frequency relative intensity noise of the filtered broadband optical signal appear, resulting in the decrease of the demodulation accuracy of the system.

SUMMARY

The present disclosure aims to provide an interferometric demodulation system and method for a large capacity fiber grating sensing network. The disclosure effectively improves the signal-to-noise ratio and demodulation accuracy of the system by designing a low-noise nanoscale wide-spectrum light source on the premise of ensuring the demodulation speed and the sensor multiplexing capacity; and realizes the measurement of the absolute wavelength of the FBG by designing a high-capacity FBG sensor array absolute wavelength calibration technology based on the TDM.

To achieve the above purpose, an interferometric demodulation system for a large capacity fiber grating sensing network is designed by the present disclosure, comprising: a nanoscale wide-spectrum light source, a pulse optical modulator, an optical circulator, a reference grating, a grating array sensing network, an optical amplifier, a Mach-Zehnder interferometer, a photoelectric converter, an embedded signal processor and a heating device; wherein: a continuous light output end of the nanoscale wide-spectrum light source is connected to an input end of the pulse optical modulator, and an output end of the pulse optical modulator is connected to a first communication end of the optical circulator, a second communication end of the optical amplifier is connected to an input end of the reference grating, an output end of the reference grating is connected to an input end of the grating array sensing network, and a third communication end of the optical circulator is connected to an input end of the optical amplifier, an output end of the optical amplifier is connected to an input end of the Mach-Zehnder interferometer, three-channel signal output ends of the Mach-Zehnder interferometer are respectively connected to signal input ends corresponding to the embedded signal processor through the photoelectric converter, and the embedded signal processor controls the heating device to control a temperature of an any one of interference arms of the Mach-Zehnder interferometer.

A demodulation method using the interferometric demodulation system for the large capacity fiber grating sensing network, comprising the following steps:

S1: outputting the nanoscale wide-spectrum optical signal from the nanoscale wide-spectrum light source;

S2: using the pulse optical modulator to modulate the nanoscale wide-spectrum optical signal into a pulse optical signal and amplify the pulse optical signal power;

S3 making the amplified pulse optical signal entering the reference grating and the grating array sensing network through the optical circulator in a sequence, wherein: an initial center wavelength of the reference grating is known, and is packaged in a temperature-isolated and a shock-isolated environment to ensure that a center wavelength is unchanged; since a spectral width of the pulse optical signal covers a working bandwidth of the FBG in the grating array sensing network, a return signal of the each FBG under a single pulse is a respective reflected spectral signal, and an optical signal reflected back by the grating array sensing network is output to the optical amplifier by the optical circulator to amplify the optical reflection signal with the sensing information and then send to the Mach-Zehnder interferometer;

S4 making the each FBG of the grating array sensing network returning optical signals and then entering the Mach-Zehnder interferometer, and being divided into two paths through the 1×2 coupler, to ensure an interference of the two paths of the optical signals, an arm length difference N of the two paths of optical fiber arms is less than the coherence length of the single FBG in the grating array sensing network; and S5: determining an arrival time of a reflected optical signal through collected three-way reflected light by the embedded signal processor, thereby obtaining a spatial position of the each FBG in the grating array sensing network, and obtaining a central wavelength variation of the each FBG by a phase wavelength demodulation algorithm, and further demodulating a central wavelength of the each FBG; the central wavelength variation is proportional to a temperature, a stress and a vibration of the object to be measured, and further realizing a distributed sensing of physical quantities.

Beneficial Effects of the Present Disclosure compared with the traditional interferometric FBG wavelength demodulation technology based on TDM, the present disclosure retains the advantages of high speed and large capacity of the original technology, and meanwhile, the signal-to-noise ratio of the system is lower and the demodulation accuracy is higher; the present disclosure has the ability to calibrate the absolute wavelength of the FBG on a large scale, realizes the reduction of the initial working state of the system to be measured, and widens the application function of the system.

DETAILED DESCRIPTION OF THE EMBODIMENTS

Figure 1:
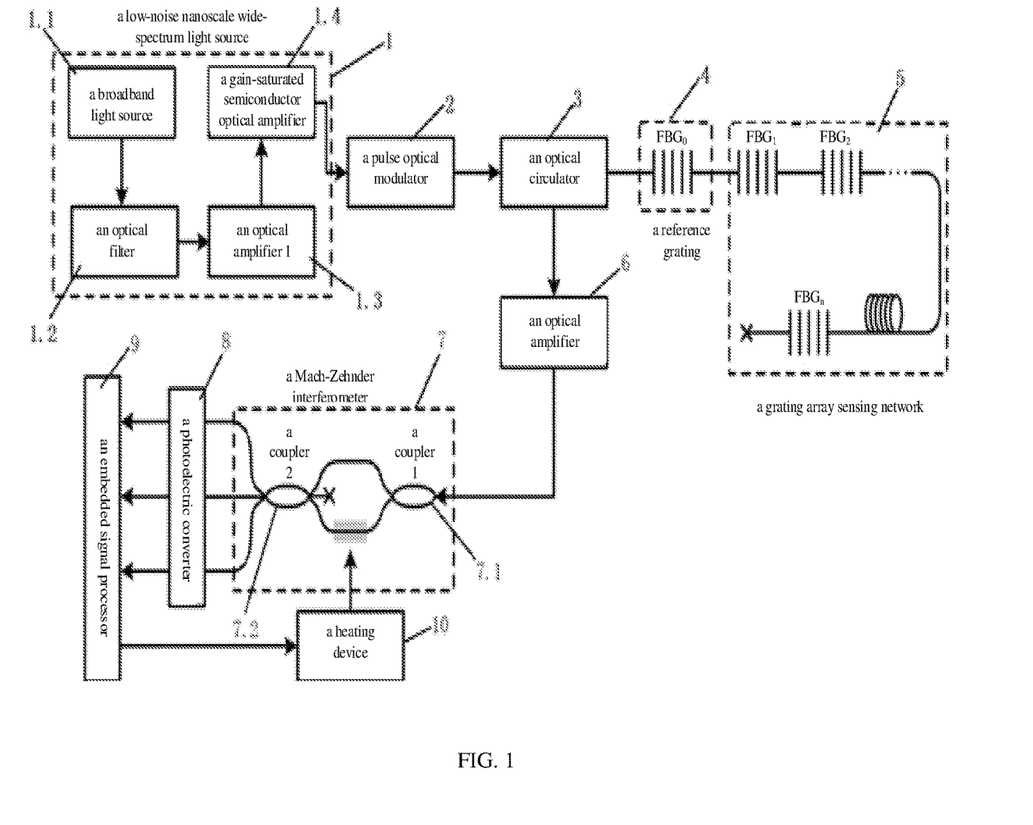
FIG. 1 illustrates an overall structure diagram of the method described in the present disclosure.
Figure 2:
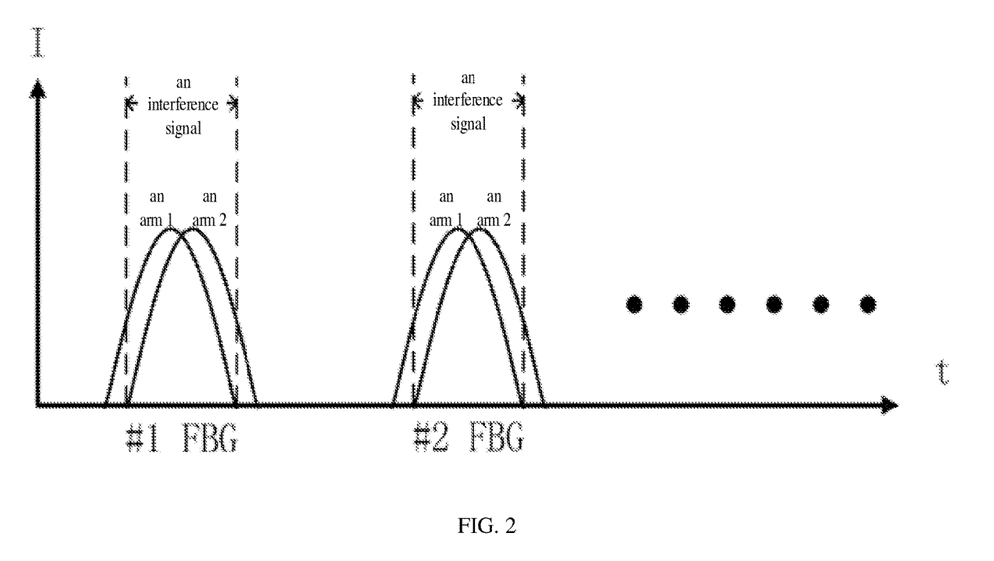
FIG. 2 illustrates a self-interference principle of grating signal for the method described in the present disclosure.

Further details of the present disclosure are given in combination with the attached figure and specific implementation embodiments below:

an interferometric demodulation system for a large capacity fiber grating sensing network shown in the FIG. 1 and FIG. 2, comprises: a nanoscale wide-spectrum light source 1, a pulse optical modulator 2, an optical circulator 3, a reference grating 4, a grating array sensing network 5, an optical amplifier 6 (pulse optical amplifier), a Mach-Zehnder interferometer 7, a photoelectric converter 8, an embedded signal processor 9 and a heating device 10; wherein: a continuous light output end of the nanoscale wide-spectrum light source 1 is connected to an input end of the pulse optical modulator 2, and an output end of the pulse optical modulator 2 is connected to a first communication end of the optical circulator 3, a second communication end of the optical amplifier 6 is connected to an input end of the reference grating 4, an output end of the reference grating 4 is connected to an input end of the grating array sensing network 5, and a third communication end of the optical circulator 3 is connected to an input end of the optical amplifier 6, an output end of the optical amplifier 6 is connected to an input end of the Mach-Zehnder interferometer 7, three-channel signal output ends of the Mach-Zehnder interferometer 7 are respectively connected to signal input ends corresponding to the embedded signal processor 9 through the photoelectric converter 8, and the embedded signal processor 9 controls the heating device 10 to control a temperature of an any one of interference arms of the Mach-Zehnder interferometer 7.

In the above technical scheme, the nanoscale wide-spectrum light source 1 comprises a broadband light source 1.1, an optical filter 1.2, the optical amplifier 1.3 and a gain-saturated semiconductor optical amplifier 1.4, wherein: the optical filter 1.2 is a nanoscale optical band-pass filter, a bandwidth range of a nanoscale optical band-pass filter is the same as a bandwidth range of the grating array sensing network 5, and the broadband light source 1.1 emits a 40 nm to 80 nm wide-spectrum optical signal, and the wide-spectrum optical signal is band-pass filtered by the optical filter 1.2, thus a filtered signal broadband is the same as a working bandwidth of the grating array sensing network 5, then the filtered signal is power amplified by the optical amplifier 6, and then is power compensated and shaped by the gain-saturated semiconductor optical amplifier 1.4, and finally a 3 nm to 7 nm nanoscale wide-spectrum optical signal with a low relative noise intensity is output;

the pulse optical modulator 2 is used for modulating an input nanoscale wide-spectrum optical signal into a pulse optical signal, so as to distinguish reflected signals of adjacent FBG in the grating array sensing network 5; and the SLED light source manufactured by American Thorlabs Company is used as the broadband light source 1.1, and a center wavelength range is 1550 nm, the broadband is 50 nm, and the maximum output power is 22 mW. The optical filter 1.2 is a bandpass optical filter having a central wavelength of 1550.9 nm, and a broadband of 7 nm. The optical amplifier is a high-gain erbium-doped fiber amplifier (EDFA) manufactured by Beijing Optical Technology Co., Ltd., with a gain of 35 dB or more. The gain-saturated semiconductor optical amplifier is a semiconductor optical amplifier (SOA) manufactured by Inphenix Company, with an operating wavelength of 1550 nm and a saturated output power of 10 dBm. In the traditional interferometric wavelength demodulation scheme, the signal-to-noise ratio (SNR) of the broadband light source is about 12 dB after filtering by a 7 nm broadband optical filter, while the low-noise nanometer wide-spectrum light source can make filtering, signal shaping and noise reduction of the continuous wide-spectrum optical signal output by the broadband light source, and finally outputs the time domain signal with the SNR of about 32 dB and has the advantages of high output power and high demodulation accuracy.

The optical circulator 3 is used for inputting the amplified pulse optical signal to the reference grating 4 and the grating array sensing network 5, and outputting the optical reflection signal returned from the reference grating 4 and the grating array sensing network 5 to the optical amplifier 6 for further processing.

The pulse optical modulator 2 is also used to amplify the pulse optical signal power. Because the reflectivity of the FBG used is weak, and the optical signal will gradually attenuate with the increase of the length of the grating array sensing network, and is necessary to have a higher light source signal strength and improve the signal-to-noise ratio.

In the above technical scheme, the reference grating 4 is packaged and placed in a temperature-isolation and a shock-isolation device, and a reflection center wavelength of the reference grating is not affected by an external temperature and vibration;

the optical amplifier 6 is used to amplify an optical reflected signal with sensing information and then send to the Mach-Zehnder interferometer 7.

In the above technical scheme, the grating array sensing network 5 is a weak reflectance FBG array, a reflectance range of the weak reflectance FBG array is 0.005% to 0.01%, a length of the grating array sensing network 5 is L, a plurality of FBGs with a coherent length≥9 mm are engraved on the grating array sensing network 5, a distance between adjacent FBG is ≥1, and a multiplexing number is ≤L/l. L is from 100 m to 5 km, l is 2 m to 100 m, 1 or 2500 can be multiplexed.

The pulse optical modulator 2 is a high-speed switching semiconductor optical amplifier (SOA) KY-PLM-16-M-FA module and modulates the continuous optical signal output by the light source into an optical pulse signal with a pulse width of 20 ns and a signal frequency of 10 kHz through the external trigger mode.

The optical circulator 3 is a conventional optical circulator for laboratory use, and the optical loss is less than 1 dB.

The reference grating 4 is packaged and placed in a temperature-isolation and a shock-isolation device, and a reflection center wavelength of the reference grating is not affected by an external temperature and vibration. In the actual embodiment, the weak reflectivity FBG with the center wavelength of 1550.90 nm, reflectivity of 0.01% is selected and packaged in the shock-isolation box and kept the operating environment temperature unchanged.

The grating array sensing network 5 is the weak reflectance FBG array, in the embodiment, a 1 km FBG sensing array with the identical weak reflectivity is selected, the center wavelength is 1550.90 nm, the reflectivity is 0.01%, the distance between gratings is 3 m, the line width of the grating is less than 80 pm, and the coherence length is about 9 mm.

The optical amplifier 6 is a pulse type erbium-doped fiber amplifier (EDFA), which is specially used for the amplification of pulse optical signals, and the EDFA has the advantages of high gain and low noise, and operates at a wavelength of 1550 nm, a bandwidth of 30 nm, a gain of more than 20 dB, a noise index of less than 5 dB, and a saturated output power of 20 dBm.

In the above technical scheme, the Mach-Zehnder interferometer 7 comprises a 1×2 coupler 7.1 and a 3×3 coupler 7.2, wherein: an input end of the 1×2 coupler 7.1 is connected to an output end of the optical amplifier 6, a first output end of the 1×2 coupler 7.1 is connected to a first input end of the 3×3 coupler 7.2, a second output end of the 1×2 coupler 7.1 is connected to a third input end of the 3×3 coupler 7.2, a second input end of the 3×3 coupler 7.2 is knotting and disabled, a first output end of the 3×3 coupler 7.2 is connected to a first input end of the photoelectric converter 8, and a second output end of the 3×3 coupler 7.2 is connected to a second input end of the photoelectric converter 8, a third output end of the 3×3 coupler 7.2 is connected to a third input end of the photoelectric converter 8;

the optical reflected signal returned by an each FBG in the grating array sensing network 5 is divided into two channels through the 1×2 coupler 7.1, wherein: a hysteresis length of a channel of the optical reflected signal is N(3 mm), the first input end of the 1×2 coupler 7.1 to the 3×3 coupler 7.2 is called a first interference arm, the second output end of the 1×2 coupler 7.1 to the third input end of the 3×3 coupler 7.2 is called a second interference arm, a sensing fiber length difference N between two interfering arms is not 0 and is less than a coherence length of a single FBG.

The photoelectric converter 8 is composed of a photodiode, a low-noise precision operational amplifier and etc., and the function is to convert the collected optical signal into an electrical signal.

In the above technical scheme, the embedded signal processor 9 is used for demodulating corresponding center wavelength information from an electric signal with the sensing information obtained by the photoelectric converter 8, and addressing a FBG by a time sequence of obtaining demodulated center wavelength information to locate a spatial position of the corresponding center wavelength information, meanwhile, the embedded signal processor 9 controls the heating device 10 to heat the any one of the interference arms of the Mach-Zehnder interferometer 7.

In the above technical scheme, the heating device 10 is used for heating the any one of the interference arms of the Mach-Zehnder interferometer 7, and through an above process, calibrating an initial center wavelength of the FBG, and further realizing an effect of reducing an initial working state of an object to be measured.

The photoelectric conversion circuit 8 is composed of an analog device with a signal-to-noise ratio of 20 dB and a gain of 40 dB, and converts the three output signals of the interferometer into electrical signals; the core component of the embedded signal processor 9 is an FPGA chip; the FPGA controls three 14-bit analog-to-digital conversion chips to collect the three electrical signals, and preprocesses the signals, obtains the position information of the grating through the optical time domain reflection technology, obtains the phase change variation after the self-interference of the corresponding grating through the phase demodulation technology, and then converts the phase change variation into the wavelength change information; finally, TCP/IP protocol is used to transmit the signal data to the host computer for interaction.

The heating device 10 is a SYG-WK temperature controller produced by the Optics Department of Wuhan Institute of Technology, with an operating temperature range of 10° C. to 85° C. and a resolution of 0.01° C. Under the control of the embedded signal processor 9, the operating temperature of an interferometer arm of the Mach-Zehnder interferometer 7 is uniformly heated from 20° C. to 80° C. to calibrate the initial absolute wavelength of the FBG in the grating array sensing network 5.

Positioning method: realizing the signal source through the time sequence of collected reflected signals, and the relationship between the time $t_s$ of the collected reflected signals and the position $D_s$ of the FBG sensor is:

$$D_s = t_s \cdot c/(2n)$$

wherein: c is a speed of light in a vacuum, n is a refractive index of a fiber core in the fiber sensing array.

A method of the interferometric demodulation system for the large capacity fiber grating sensing network wherein:
  S1: outputting the nanoscale wide-spectrum optical signal from the nanoscale wide-spectrum light source 1;
  S2: using the pulse optical modulator 2 to modulate the nanoscale wide-spectrum optical signal into a pulse optical signal so as to realize the difference of the return signal of the adjacent FBG, and amplify the pulse optical signal power;
  S3 making the amplified pulse optical signal entering the reference grating 4 and the grating array sensing network 5 through the optical circulator 3 in a sequence, wherein: an initial center wavelength of the reference grating 4 is known, and is packaged in a temperature-isolated and a shock-isolated environment to ensure that a center wavelength is unchanged; since a spectral width of the pulse optical signal covers a working bandwidth of the FBG in the grating array sensing network 5, a return signal of the each FBG under a single pulse is a respective reflected spectral signal, and an optical signal reflected back by the grating array sensing network 5 is output to the optical amplifier 6 by the optical circulator 3 to amplify the optical reflection signal with the sensing information and then send to the Mach-Zehnder interferometer 7;

S4 making the each FBG of the grating array sensing network 5 returning optical signals and then entering the Mach-Zehnder interferometer 7, and being divided into two paths through the 1×2 coupler 7.1, to ensure an interference of the two paths of the optical signals, an arm length difference N of the two paths of optical fiber arms is less than the coherence length of the single FBG in the grating array sensing network 5; and S5: determining an arrival time of a reflected optical signal through collected three-way reflected light by the embedded signal processor 9, thereby obtaining a spatial position of the each FBG in the grating array sensing network 5, and obtaining a central wavelength variation of the each FBG by a phase wavelength demodulation algorithm, and further demodulating a central wavelength of the each FBG; the central wavelength variation is proportional to a temperature, a stress and a vibration of the object to be measured, and further realizing a distributed sensing of physical quantities.

In the S1 of the above technical scheme, broadband light sources emit flat, wide-spectrum continuous light. In the traditional technology, the instantaneous power of the broadband light source signal in each longitudinal mode is not equal. By increasing the spectral width of the light source output spectrum, the relative intensity noise of the light source can be increased, so as to ensure the high signal-to-noise ratio of the system. However, in the interferometric FBG demodulation method, with the decrease of FBG reflectivity and the increase of sensing distance, the effective optical power of the light source output is required, that is, the spectral width of the light source needs to be reduced to the working bandwidth of FBG (reducing about 10 times).

However, the relative noise intensity of the narrowband filtered optical signal increases. In the pulse modulation demodulation system, the high frequency optical noise will affect the signal-to-noise ratio and the demodulation accuracy. Therefore, the present disclosure designs a low-noise nanometer wide-spectrum light source. The optical filter, the optical amplifier 1 and the gain-saturated semiconductor optical amplifier are sequentially connected after the broadband light source to reduce noise and shape the light source signal. Wherein: the nanoscale wide-spectrum light source comprises a broadband light source, an optical filter, the optical amplifier and a gain-saturated semiconductor optical amplifier, wherein: the optical filter is a nanoscale optical band-pass filter, a bandwidth range of a nanoscale optical band-pass filter is the same as a bandwidth range of the grating array sensing network, and the broadband light source emits a wide-spectrum optical signal, and the wide-spectrum optical signal is band-pass filtered by the optical filter, thus a filtered signal broadband is the same as a working bandwidth of the grating array sensing network, then the filtered signal is power amplified by the optical amplifier, and then is power compensated and shaped by the gain-saturated semiconductor optical amplifier, and finally a nanoscale wide-spectrum optical signal is output; the optical filter is a nanoscale optical band-pass filter, and the bandwidth range of the nanoscale optical band-pass filter is the same as the operating bandwidth range of the FBG sensing network; the function of the optical amplifier 1 is power amplification, so as to ensure that the optical signal has a certain initial power in each longitudinal mode; the gain-saturated semiconductor optical amplifier works in a saturated state, further amplifying and flattening the optical power intensity under each longitudinal mode. The output signals of the designed low-noise nanoscale wide-spectrum light source are the low-noise continuous optical signals whose bandwidth range matches the operating bandwidth of FBG sensing network.

In the S2 of the above technical scheme, a pulse width t and a period T of the pulse optical signal in the S2 satisfy a following formula:

$$t < \frac{2nl}{c}$$
$$T > \frac{2nL}{c}$$

wherein: n is a refractive index of a fiber core in the grating array sensing network 5, and c is a speed of light in a vacuum, l is a distance between two adjacent gratings in the grating array sensing network 5, and L is a total length of the grating array sensing network 5;

in the S5, the reflected optical signal of an $FBG_i$ which is an ith FBG in the grating array sensing network 5, after passing through the 1×2 coupler 7.1 and arriving at the 3×3 coupler 7.2, forms two beams of light $\vec{E_1}$ and $\vec{E_2}$, the $\vec{E_1}$ and the $\vec{E_2}$ are respectively represented as follows:

$$\begin{cases} \vec{E_1} = \vec{E}\cos\left(\frac{2\pi c}{n\lambda_i}t + \varphi_1\right) \\ \vec{E_2} = \vec{E}\cos\left(\frac{2\pi c}{n\lambda_i}t + \varphi_2\right) \end{cases}$$

wherein: $|\vec{E}|$ represents an amplitude of the two beams of light, since the 1×2 coupler of 1:1 is selected, the intensity of the two optical signals is equal; $\lambda_i$ is a central wavelength of the $FBG_i$, φ1 and φ2 represents a phase of two optical signals and respectively relates to the arm length of two optical fiber arms;

the two beams of light are interfered in the 3×3 coupler 7.2 to form a reflected light interference signal $\vec{E_c}$;

$$\vec{E_c} = \vec{E_1} + \vec{E_1}$$

then an interference signal strength I:

$$I = \langle \vec{E_c} \cdot \vec{E_c} \rangle = \langle [\vec{E_1} + \vec{E_2}] \cdot [\vec{E_1} + \vec{E_2}] \rangle = 2E^2 + 2E^2 \cos(\varphi_d)$$

wherein: $\vec{E_c}$, $\vec{E_1}$ and $\vec{E_2}$ denote a conjugation of $\vec{E_c}$, $\vec{E_1}$ and $\vec{E_2}$ respectively, and E denotes a light intensity of a single beam of light;

$\varphi_d$ is a phase difference of the two optical signals:

$$\varphi_d = \frac{2n\pi N}{\lambda_i}$$

wherein: N is the arm length difference of two optical fiber arms, and n is the refractive index of an optical fiber core in the grating array sensing network 5;

the two optical signals interfere in the 3×3 coupler 7.2 through the optical fiber arms, an output intensity ratio of the 3×3 coupler 7.2 is 1:1:1, and the phase difference of an each output signal is $2\pi/3$, output signals $I_1$, $I_2$ and $I_3$ of three output ends of the 3×3 coupler 7.2 are represented as:

$$\begin{cases} I_1 = A + B\cos\left(\varphi_d - \frac{2\pi}{3}\right) \\ I_2 = A + B\cos(\varphi_d + 0) \\ I_3 = A + B\cos\left(\varphi_d + \frac{2\pi}{3}\right) \end{cases}$$

wherein A is a direct current component of an interference signal and B is an alternating current component of the interference signal;

simultaneous equations $I_1$, $I_2$ and $I_3$ can be obtained as follows:

$$\varphi_d = \arctan\left(\frac{I_1 + I_2 - 2I_3}{\sqrt{3}(I_1 - I_2)}\right)$$

when N, n and λ are fixed, a relationship between a variation $\Delta\lambda_i$ of $\lambda_i$ and a variation $\Delta\varphi_d$ of a phase difference $\varphi_d$ is as follows:

$$\Delta\lambda_i = -\frac{J_i^2}{2\pi n N}\Delta\varphi_d$$

wherein: $J_i$ is an initial center wavelength of the FBG$_i$, $\Delta\lambda_i = \lambda_i - J_i$; and by monitoring a phase shift of a self-interference signal of an each FBG reflected signal, a relative change of the center wavelength is obtained, and a change of the center wavelength is proportional to a change of the temperature, the stress and the vibration of the object to be measured, and then the distributed sensing of the physical quantities is realized.

In the S5 of the above technical scheme, calibrating the initial center wavelength $J_i$ of the ith FBG, the FBG$_i$ in the grating array sensing network 5, and heating the any interference arm of the Mach-Zehnder interferometer 7 by the heating device 10, a length of a heated optical fiber is $L_H$, and demodulating a phase shift of the each FBG simultaneously; under an influence of the temperature, changing the refractive index n and the arm length difference N, so a relationship between a phase difference change amount $\Delta\varphi_d$ and a temperature change amount $\Delta T$ is shown as follows:

$$\frac{\Delta\varphi_d}{\Delta T} = \frac{2\pi}{\lambda_i}\left(N\frac{\Delta n}{\Delta T} + nL_H\alpha\right)$$

wherein: $\Delta n/\Delta T$ is a thermal-optical coefficient of a fiber core material, representing a rate of the refractive index with the change of the temperature, and α is a thermal expansion coefficient of the fiber core material;

the fiber core material commonly used in engineering is fused quartz, and a relationship between the refractive index n and a wavelength of a transmitted signal in fiber is:

$$n(\lambda) \approx \sqrt{1 + \frac{0.70\lambda^2}{\lambda^2 - 4679.15} + \frac{0.41\lambda^2}{\lambda^2 - 13512.06} + \frac{0.90\lambda^2}{\lambda^2 - 10^9}}$$

wherein: λ is a wavelength variable;

calculating a ratio of a phase shift $(\Delta\varphi_d)_i$ of the ith FBG to a phase shift $(\Delta\varphi_d)_r$ of the reference grating 4, and obtaining:

$$\frac{(\Delta\varphi_d)_i}{(\Delta\varphi_d)_r} = \frac{(\Delta\varphi_d)_i}{\Delta T}\frac{\Delta T}{(\Delta\varphi_d)_r} = \frac{\lambda_r}{J_i}\left[\frac{N\frac{\Delta n(J_i)}{\Delta T} + n(J_i)L_H\alpha}{N\frac{\Delta n(\lambda_r)}{\Delta T} + n(\lambda_r)L_H\alpha}\right]$$

since $N(\Delta n/\Delta T) \ll nL_H\alpha$, after simplifying and integrating, obtaining:

$$\frac{(\varphi_d)_i}{(\varphi_d)_r} = \frac{\lambda_r n(J_i)}{J_i n(\lambda_r)}$$

wherein: $\lambda_r$ represents a center wavelength of the reference grating 4, $\Delta n(J_i)/\Delta T$ and $\Delta n(\lambda_r)/\Delta T$ represent a change rate of the refractive index of the fiber core with the temperature when the light with wavelengths of $J_i$ and $\lambda_r$ transmit in optical fiber; $n(J_i)$ and $n(\lambda_r)$ represent the refractive index of the fiber core when the light with the wavelengths of $J_i$ and $\lambda_r$ transmit in the optical fiber.

Since the center wavelength $\lambda_r$ of the reference grating is known, the initial center wavelength of all FBG in the grating array sensing network can be obtained by calculating a ratio of phase shifts.

Since the calibration process is performed only once when the system is in use, the demodulation speed of the system will not be affected.

The present disclosure uses an optical filter, an optical amplifier and a gain-saturated semiconductor amplifier to amplify, filter and shape a broadband light source, and produces a low-noise nanoscale wide-spectrum light source, so that the demodulation accuracy and the signal-to-noise ratio of the system are effectively improved; the weak reflectivity FBG array is used to increase the multiplexing capacity of the sensor, so that the traditional spectral demodulation is converted into a phase demodulation wavelength, the speed is greatly improved, and the system cost is reduced; the heating device is used to realize large-scale calibration of the absolute wavelength of a grating array sensing network, and the high-speed wavelength demodulation technology is used to realize the real-time demodulation of the absolute wavelength.

The contents not described in detail in the summary belongs to the prior art known to those skilled in the art.

What is claimed is:

1. An interferometric demodulation system for a large capacity fiber grating sensing network, comprising: a nanoscale wide-spectrum light source, a pulse optical modulator, an optical circulator, a reference grating, a grating array sensing network, an optical amplifier, a Mach-Zehnder interferometer, a photoelectric converter, an embedded signal processor and a heating device; wherein: a continuous light output end of the nanoscale wide-spectrum light source is connected to an input end of the pulse optical modulator, and an output end of the pulse optical modulator is connected to a first communication end of the optical circulator, a second communication end of the optical amplifier is connected to an input end of the reference grating, an output end of the reference grating is connected to an input end of the grating array sensing network, and a third communication end of the optical circulator is connected to an input end of the optical amplifier, an output end of the optical amplifier is connected to an input end of the Mach-Zehnder interferometer, three-channel signal output ends of the Mach-Zehnder interferometer are respectively connected to signal input ends corresponding to the embedded signal processor through the photoelectric converter, and the embedded signal processor controls the heating device to control a temperature of an any one of interference arms of the Mach-Zehnder interferometer,     wherein the nanoscale wide-spectrum light source comprises a broadband light source, an optical filter, the optical amplifier and a gain-saturated semiconductor optical amplifier, and     wherein the optical filter is a nanoscale optical band-pass filter, a bandwidth range of a nanoscale optical band-pass filter is the same as a bandwidth range of the grating array sensing network, and the broadband light source emits a wide-spectrum optical signal, and the wide-spectrum optical signal is band-pass filtered by the optical filter, thus a filtered signal broadband is the same as a working bandwidth of the grating array sensing network, then the filtered signal is power amplified by the optical amplifier, and then is power compensated and shaped by the gain-saturated semiconductor optical amplifier, and finally a nanoscale wide-spectrum optical signal is output;

the pulse optical modulator is used for modulating an input nanoscale wide-spectrum optical signal into a pulse optical signal, so as to distinguish reflected signals of adjacent FBG in the grating array sensing network; and     the pulse optical modulator is also used to amplify the pulse optical signal power.

2. The interferometric demodulation system for the large capacity fiber grating sensing network according to claim 1, wherein: the reference grating is packaged and placed in a temperature-isolation and a shock-isolation device, and a reflection center wavelength of the reference grating is not affected by an external temperature and vibration; and     the optical amplifier is used to amplify an optical reflected signal with sensing information and then send to the Mach-Zehnder interferometer.

3. The interferometric demodulation system for the large capacity fiber grating sensing network according to claim 1, wherein: the grating array sensing network is a weak reflectance FBG array, a reflectance range of the weak reflectance FBG array is 0.005% to 0.01%, a length of the grating array sensing network is L, a plurality of FBGs with a coherent length≥m are engraved on the grating array sensing network, a distance between adjacent FBG is ≥l, and a multiplexing number is ≤l.

4. The interferometric demodulation system for the large capacity fiber grating sensing network according to claim 1, wherein: the Mach-Zehnder interferometer comprises a 1×2 coupler and a 3×3 coupler, wherein: an input end of the 1×2 coupler is connected to an output end of the optical amplifier, a first output end of the 1×2 coupler is connected to a first input end of the 3×3 coupler, a second output end of the 1×2 coupler is connected to a third input end of the 3×3 coupler, a second input end of the 3×3 coupler is disabled, a first output end of the 3×3 coupler is connected to a first input end of the photoelectric converter, and a second output end of the 3×3 coupler is connected to a second input end of the photoelectric converter, a third output end of the 3×3 coupler is connected to a third input end of the photoelectric converter; and the optical reflected signal returned by an each FBG in the grating array sensing network is divided into two channels through the 1×2 coupler, wherein: a hysteresis length of a channel of the optical reflected signal is N, the first input end of the 1×2 coupler to the 3×3 coupler is called a first interference arm, the second output end of the 1×2 coupler to the third input end of the 3×3 coupler is called a second interference arm, a sensing fiber length difference N between two interfering arms is not 0 and is less than a coherence length of a single FBG.

5. The interferometric demodulation system for the large capacity fiber grating sensing network according to claim 1, wherein: the embedded signal processor is used for demodulating corresponding center wavelength information from an electric signal with the sensing information obtained by the photoelectric converter, and addressing a FBG by a time sequence of obtaining demodulated center wavelength information to locate a spatial position of the corresponding center wavelength information, meanwhile, the embedded signal processor controls the heating device to heat the any one of the interference arms of the Mach-Zehnder interferometer.

6. The interferometric demodulation system for the large capacity fiber grating sensing network according to claim 1, wherein: the heating device is used for heating the any one of the interference arms of the Mach-Zehnder interferometer, and through an above process, calibrating an initial center wavelength of the FBG, and further realizing an effect of reducing an initial working state of an object to be measured.

7. A demodulation method of the interferometric demodulation system for the large capacity fiber grating sensing network according to claim 1, wherein:

S1: outputting the nanoscale wide-spectrum optical signal from the nanoscale wide-spectrum light source;

S2: using the pulse optical modulator to modulate the nanoscale wide-spectrum optical signal into a pulse optical signal and amplify the pulse optical signal power;

S3: making the amplified pulse optical signal entering the reference grating and the grating array sensing network through the optical circulator in a sequence, wherein: an initial center wavelength of the reference grating is known, and is packaged in a temperature-isolated and a shock-isolated environment to ensure that a center wavelength is unchanged; since a spectral width of the pulse optical signal covers a working bandwidth of the FBG in the grating array sensing network, a return signal of the each FBG under a single pulse is a respective reflected spectral signal, and an optical signal reflected back by the grating array sensing network is output to the optical amplifier by the optical circulator to amplify the optical reflection signal with the sensing information and then send to the Mach-Zehnder interferometer;

S4: making the each FBG of the grating array sensing network returning optical signals and then entering the Mach-Zehnder interferometer, and being divided into two paths through the 1×2 coupler, to ensure an interference of the two paths of the optical signals, an arm length difference N of the two paths of optical fiber arms is less than the coherence length of the single FBG in the grating array sensing network; and     S5: determining an arrival time of a reflected optical signal through collected three-way reflected light by the embedded signal processor, thereby obtaining a spatial position of the each FBG in the grating array sensing network, and obtaining a central wavelength variation of the each FBG by a phase wavelength demodulation algorithm, and further demodulating a central wavelength of the each FBG; the central wavelength variation is proportional to a temperature, a stress and a vibration of the object to be measured, and further realizing a distributed sensing of physical quantities.

8. The demodulation method of the interferometric demodulation system for the large capacity fiber grating sensing network according to claim 7, wherein: a pulse width t and a period T of the pulse optical signal in the S2 satisfy a following formula:

$$t < \frac{2nl}{c}, \text{ and } T > \frac{2nL}{c}$$

wherein: n is a refractive index of a fiber core in the grating array sensing network, and c is a speed of light in a vacuum, l is a distance between two adjacent gratings in the grating array sensing network, and L is a total length of the grating array sensing network;

in the S5, the reflected optical signal of an FBG which is an ith FBG in the grating array sensing network, after passing through the 1×2 coupler and arriving at the 3×3 coupler, forms two beams of light $\vec{E_1}$ and $\vec{E_2}$, the $\vec{E_1}$ and the $\vec{E_2}$ are respectively represented as follows:

$$\begin{cases} \vec{E_1} = \vec{E}\cos\left(\frac{2\pi c}{n\lambda_i}t + \varphi_1\right) \\ \vec{E_2} = \vec{E}\cos\left(\frac{2\pi c}{n\lambda_i}t + \varphi_2\right) \end{cases}$$

wherein: $|\vec{E}|$ represents an amplitude of the two beams of light, $\lambda_i$ is a central wavelength of the $FBG_i$, φ1 and φ2 represents a phase of two optical signals;

the two beams of light are interfered in the 3×3 coupler to form a reflected light interference signal $\vec{E_c}$;

$$\vec{E_c} = \vec{E_1} + \vec{E_1}$$

then an interference signal strength I:

$$I = \langle \vec{E_c} \cdot \vec{E_c^*} \rangle = \langle [\vec{E_1} + \vec{E_2}] \cdot [\vec{E_1^*} + \vec{E_2^*}] \rangle = 2E^2 + 2E^2 \cos(\varphi_d)$$

wherein: $\vec{E_c^*}$, $\vec{E_1^*}$ and $\vec{E_2^*}$ denote a conjugation of $\vec{E_c}$, $\vec{E_1}$ and $\vec{E_2}$ respectively, and E denotes a light intensity of a single beam of light;

$\varphi_d$ is a phase difference of the two optical signals:

$$\varphi_d = \frac{2n\pi N}{\lambda_i}$$

wherein: N is the arm length difference of two optical fiber arms, and n is the refractive index of an optical fiber core in the grating array sensing network;

the two optical signals interfere in the 3×3 coupler through the optical fiber arms, an output intensity ratio of the 3×3 coupler is 1:1:1, and the phase difference of an each output signal is 2π/3, output signals $I_1$, $I_2$ and $I_3$ of three output ends of the 3×3 coupler are represented as:

$$\begin{cases} I_1 = A + B\cos\left(\varphi_d - \frac{2\pi}{3}\right) \\ I_2 = A + B\cos(\varphi_d + 0) \\ I_3 = A + B\cos\left(\varphi_d + \frac{2\pi}{3}\right) \end{cases}$$

wherein A is a direct current component of an interference signal and B is an alternating current component of the interference signal;

simultaneous equations $I_1$, $I_2$ and $I_3$ can be obtained as follows:

$$\varphi_d = \arctan\left(\frac{I_1 + I_2 - 2I_3}{\sqrt{3}(I_1 - I_2)}\right)$$

when N, n and λ are fixed, a relationship between a variation $\Delta\lambda_i$ of $\lambda_i$ and a variation $\Delta\varphi_d$ of a phase difference φd is as follows:

$$\Delta\lambda_i = -\frac{J_i^2}{2\pi nN}\Delta\varphi_d$$

wherein: $J_i$ is an initial center wavelength of the $FBG_i$, $\Delta\lambda_i = \lambda_i - J_i$; and by monitoring a phase shift of a self-interference signal of an each FBG reflected signal, a relative change of the center wavelength is obtained, and a change of the center wavelength is proportional to a change of the temperature, the stress and the vibration of the object to be measured, and then the distributed sensing of the physical quantities is realized.

9. The demodulation method of the interferometric demodulation system for the large capacity fiber grating sensing network according to claim 7, wherein: in the S5, calibrating the initial center wavelength $J_i$ of the ith FBG, the $FBG_i$ in the grating array sensing network, and heating the any interference arm of the Mach-Zehnder interferometer by the heating device, a length of a heated optical fiber is $L_H$, and demodulating a phase shift of the each FBG simultaneously; under an influence of the temperature, changing the refractive index n and the arm length difference N, so a relationship between a phase difference change amount Δφd and a temperature change amount ΔT is shown as follows:

$$\frac{\Delta\varphi_d}{\Delta T} = \frac{2\pi}{\lambda_i}\left(N\frac{\Delta n}{\Delta T} + nL_H\alpha\right)$$

wherein: Δn/ΔT is a thermal-optical coefficient of a fiber core material, representing a rate of the refractive index with the change of the temperature, and α is a thermal expansion coefficient of the fiber core material;

the fiber core material commonly used in engineering is fused quartz, and a relationship between the refractive index n and a wavelength of a transmitted signal in fiber is:

$$n(\lambda) \approx \sqrt{1 + \frac{0.70\lambda^2}{\lambda^2 - 4679.15} + \frac{0.41\lambda^2}{\lambda^2 - 13512.06} + \frac{0.90\lambda^2}{\lambda^2 - 10^9}}$$

wherein: λ is a wavelength variable;

calculating a ratio of a phase shift $(\Delta\varphi_d)_i$ of the ith FBG to a phase shift $(\Delta\varphi_d)_r$ of the reference grating, and obtaining:

$$\frac{(\Delta\varphi_d)_i}{(\Delta\varphi_d)_r} = \frac{(\Delta\varphi_d)_i}{\Delta T} \frac{\Delta T}{(\Delta\varphi_d)_r} = \frac{\lambda_r}{J_i}\left[\frac{N\frac{\Delta n(J_i)}{\Delta T} + n(J_i)L_H\alpha}{N\frac{\Delta n(\lambda_r)}{\Delta T} + n(\lambda_r)L_H\alpha}\right]$$

since $N(\Delta n/\Delta T) \ll nL_H\alpha$, after simplifying and integrating, obtaining:

$$\frac{(\varphi_d)_i}{(\varphi_d)_r} = \frac{\lambda_r n(J_i)}{J_i n(\lambda_r)}$$

wherein: $\lambda_r$ represents a center wavelength of the reference grating, $\Delta n(J_i)/\Delta T$ and $\Delta n(\lambda_r)/\Delta T$ represent a change rate of the refractive index of the fiber core with the temperature when the light with wavelengths of $J_i$ and $\lambda_r$ transmit in optical fiber; $n(J_i)$ and $n(\lambda_r)$ represent the refractive index of the fiber core when the light with the wavelengths of $J_i$ and $\lambda_r$ transmit in the optical fiber; and since the center wavelength $\lambda_r$ of the reference grating is known, the initial center wavelength of all FBG in the grating array sensing network can be obtained by calculating a ratio of phase shifts.

\* \* \* \* \*